(12) United States Patent
Ohara

(10) Patent No.: US 10,003,735 B2
(45) Date of Patent: Jun. 19, 2018

(54) CALCULATION DEVICE AND IMAGE PICKUP DEVICE USING CALCULATION DEVICE AND CALCULATION METHOD

(71) Applicant: CANON KABUSHIKI KAISHA, Tokyo (JP)

(72) Inventor: Naoyuki Ohara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 15/246,251

(22) Filed: Aug. 24, 2016

(65) Prior Publication Data
US 2017/0064191 A1   Mar. 2, 2017

(30) Foreign Application Priority Data

Aug. 31, 2015 (JP) ................................. 2015-170593

(51) Int. Cl.
*H04N 5/232* (2006.01)
*G03B 13/36* (2006.01)

(52) U.S. Cl.
CPC ......... *H04N 5/23212* (2013.01); *G03B 13/36* (2013.01); *H04N 5/23219* (2013.01); *H04N 5/23296* (2013.01)

(58) Field of Classification Search
CPC ........... H04N 5/23212; H04N 13/0217; H04N 13/0271; H04N 5/2254; H04N 5/3696; H04N 9/045; G02B 13/0015; G02B 7/34; H01L 27/14623; H01L 27/14627
See application file for complete search history.

(56) References Cited

U.S. PATENT DOCUMENTS

| | | | | |
|---|---|---|---|---|
| 5,585,843 A * | 12/1996 | Ishizuka | ............ | H04N 5/23248 348/208.13 |
| 6,407,771 B1 * | 6/2002 | Kanbara | ............ | H04N 5/23248 348/207.99 |
| 2002/0125409 A1 * | 9/2002 | Nagano | ................ | G01J 1/4214 250/208.1 |
| 2007/0237429 A1 * | 10/2007 | Kusaka | .............. | H04N 5/23212 382/312 |
| 2011/0205423 A1 * | 8/2011 | Tsukada | ................. | G02B 7/38 348/345 |
| 2015/0156400 A1 * | 6/2015 | Seo | .................... | H04N 5/23212 348/353 |
| 2017/0090149 A1 * | 3/2017 | Galor Gluskin | ....... | G02B 7/285 |

FOREIGN PATENT DOCUMENTS

| | | |
|---|---|---|
| JP | 2001-305415 A | 10/2001 |
| JP | 2010-271419 A | 12/2010 |
| JP | 2012-128287 A | 7/2012 |

\* cited by examiner

*Primary Examiner* — Trung Diep
(74) *Attorney, Agent, or Firm* — Canon U.S.A., Inc. IP Division

(57) ABSTRACT

Highly accurate focus adjustment device can be provided, for example, that includes a focus detection area setting unit that sets a focus detection area to a position of a face detected in an image pickup field angle, and sets a luminance addition number and a correlation addition number in the focus detection area according to a size of the face, and performs focus detection for the face, thereby to suppress a decrease in accuracy.

6 Claims, 13 Drawing Sheets

CALCULATION DEVICE AND IMAGE PICKUP DEVICE USING CALCULATION DEVICE AND CALCULATION METHOD

BACKGROUND OF THE INVENTION

Field of the Invention

The present invention relates to a calculation device, favorably of an image pickup device such as a digital camera or a video camera, for example for calculation of a defocus amount.

Description of the Related Art

As one of autofocus (AF) methods equipped in image pickup devices such as cameras, there is a phase difference detection method (hereinafter, written as phase difference autofocus).

In the phase difference autofocus, a light flux having passed through an exit pupil of a photographic lens is divided into two, and the divided light fluxes are respectively received by a pair of focus detection sensors.

Then, by detecting a shift amount of signals output from the pair of focus detection sensors, that is, an amount of relative position shift amount (hereinafter, written as image shift amount) of the light fluxes in a dividing direction, a shift amount (hereinafter, written as defocus amount) of the photographic lens in a focusing direction is obtained, and a focus lens is controlled.

Japanese Patent Laid-Open No. 2001-305415 discloses a configuration that does not require dedicated focus detection sensors by providing a phase difference detection function to an image pickup element, and realizes high-speed phase difference autofocus.

The configuration of Japanese Patent Laid-Open No. 2001-305415 divides a photoelectric conversion unit of a pixel of the image pickup element into two and provides a pupil-dividing function to the divided photoelectric conversion units, and individually processes outputs of the divided photoelectric conversion units, thereby to perform focus detection, and uses an added-up output of the divided photoelectric conversion units as an image signal.

Japanese Patent Laid-Open No. 2010-271419 discloses a configuration that decreases an influence of noises in focus detection by a photoelectric conversion unit to which a pupil-dividing function is provided.

The configuration of Japanese Patent Laid-Open No. 2010-271419 detects brightness of each line of an image pickup element, and performs line addition in a case where the brightness is darker than brightness set in advance.

Further, Japanese Patent Laid-Open No. 2012-128287 discloses a method of setting a focus detection area for increasing accuracy of focus detection in a case where a face is small in performing the focus detection for the face detected from an image pickup signal.

However, the configuration of Japanese Patent Laid-Open No. 2001-305415 has a problem that, in setting a focus detection area to a face detected from an image pickup signal, the focus detection area having a sufficient size cannot be set when the face is small, and accuracy of the focus detection is decreased.

Further, there is a problem that near and far objects in one frame occur because the face and the background enter the focus detection area, if the focus detection area remains large in order to increase the accuracy.

The configuration of Japanese Patent Laid-Open No. 2010-271419 has a problem that an optimum focus detection area cannot be set to the face detected from the image pickup signal because the line addition is performed according to the brightness.

The configuration of Japanese Patent Laid-Open No. 2012-128287 provides the focus detection area to a body as well in the case where the face is small, thereby to suppress the decrease in the focus detection accuracy.

However, no consideration is given to an addition method in the focus detection area in the phase difference autofocus, and to a ratio of enlargement of the focus detection area.

SUMMARY OF THE INVENTION

In accordance with an aspect of the present invention, highly accurate focus adjustment device and image pickup device are provided that suppress a decrease in accuracy of focus detection in performing the focus detection based on photographing conditions of an object (the size of the object, a defocus amount, and a contrast value).

In accordance with another aspect of the present invention, a calculation device that calculates a defocus amount using a parallax image signal output from an image pickup element includes a calculation unit and a detection unit. The calculation unit is configured to acquire a first correlation signal of the parallax image signal, composite a plurality of the first correlation signals to acquire a second correlation signal, and calculate the defocus amount based on the second correlation signal. A detection unit is configured to detect a predetermined object. In processing of the detection unit, a composite amount of signals from the image pickup element in acquiring the first correlation signal of a case where a size of the object detected in the detection unit is smaller than a predetermined amount is smaller than a composite amount of signals from the image pickup element in acquiring the first correlation signal of a case where the size of the object detected in the object detection unit is the predetermined amount or more, and a composite amount of the first correlation signal in acquiring the second correlation signal of a case where the size of the object detected in the object detection unit is smaller than the predetermined amount is larger than a composite amount of the first correlation signals in acquiring the second correlation signal of a case where the size of the object detected in the object detection unit is the predetermined amount or more.

Further features of the present invention will become apparent from the following description of exemplary embodiments (with reference to the attached drawings).

DESCRIPTION OF THE EMBODIMENTS

Figure 1:
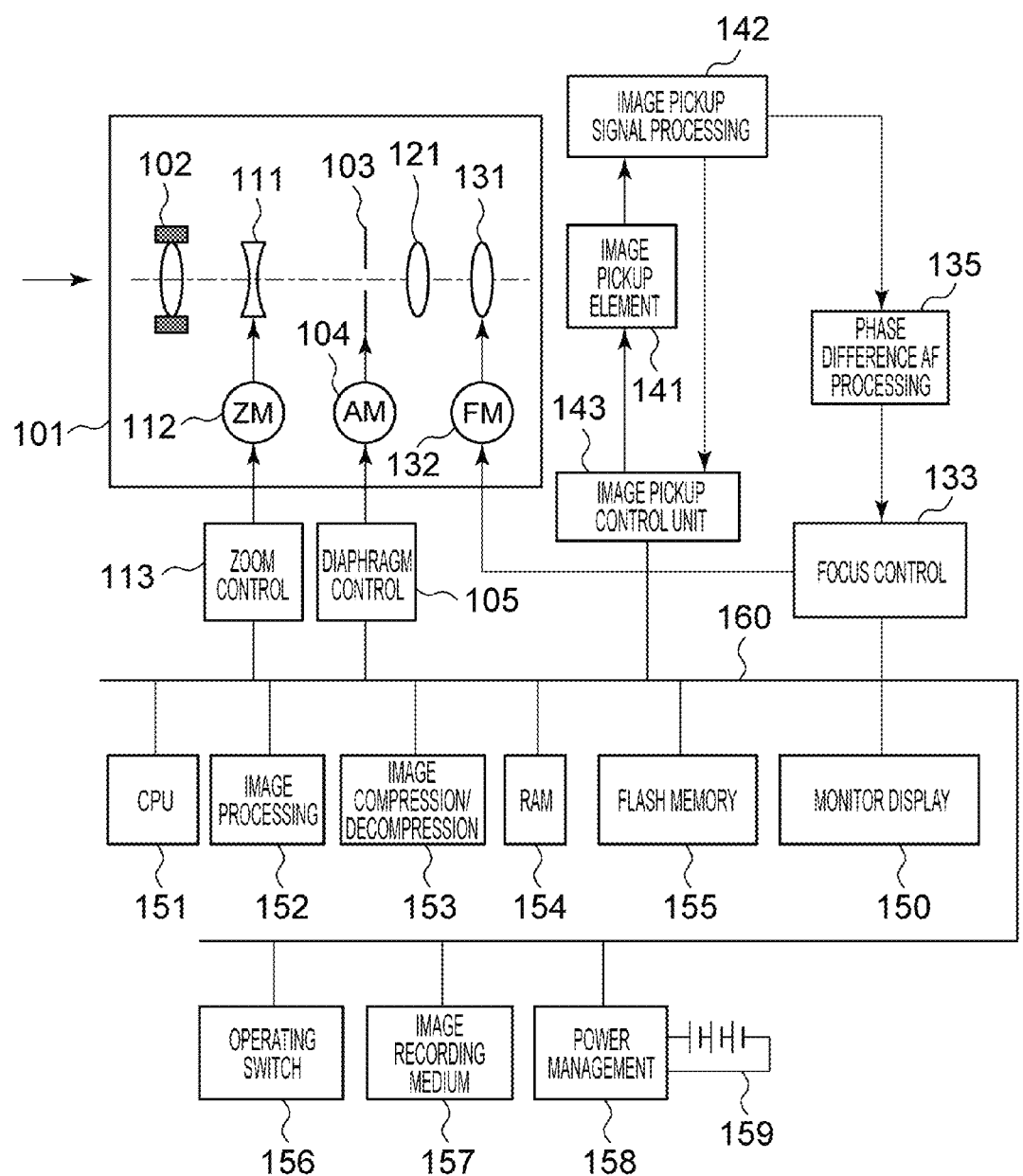
FIG. 1 is a block diagram illustrating a configuration of an image pickup device to which a focus adjustment device in the present exemplary embodiment is applied.

Hereinafter, exemplary embodiments of the present invention will be described with reference to the drawings. Note that the same member in the drawings is denoted with the same reference number, and overlapping description is omitted.

First Exemplary Embodiment

Description of Block Diagram of Image Pickup Device

First, a configuration of an image pickup device in the present exemplary embodiment will be described with reference to FIG. 1. FIG. 1 is a block diagram illustrating a configuration of an image pickup device 100.

The image pickup device 100 is, but not limited to, a video camera or a digital still camera that captures an object, and can record data of a motion image or a still image in various media such as a tape, a solid state memory, an optical disk, and a magnetic disk.

Further, units in the image pickup device 100 are connected through a bus 160, and are controlled by a main CPU 151 (central processing device).

The image pickup device 100 includes an image pickup element that includes a plurality of photoelectric conversion elements that shares one micro lens, and is equipped with a focus adjustment device that performs focus detection in a phase difference system using an image signal output by the image pickup element.

The focus adjustment device of the present exemplary embodiment is a device that performs focus adjustment in a phase difference system using focus detection signals output from respective pixels of the image pickup element that receives, with a pair of photoelectric conversion units, a pair of light fluxes having passed through different pupil regions of an image pickup optical system.

The focus adjustment device of the present exemplary embodiment is applied to an image pickup system configured from an image pickup device (image pickup device body) that can acquire an optical image obtained through the image pickup optical system (photographic lens), and the image pickup optical system detachable from the image pickup device body.

However, the present exemplary embodiment is not limited thereto, and is applicable to an image pickup device in which the image pickup optical system is integrally provided with the image pickup device body.

A photographic lens 101 is configured as a lens unit that includes a first fixed lens group 102, a zoom lens 111, a diaphragm 103, a second fixed lens group 121, and a focus lens 131.

A diaphragm control unit 105 adjusts an aperture diameter of the diaphragm 103 and performs light amount adjustment at the time of capturing an object, by driving the diaphragm 103 through a diaphragm motor 104 according to a command from a main CPU 151. A zoom control unit 113 changes a focal length, by driving the zoom lens 111 through a zoom motor 112.

Further, a focus control unit 133 controls a focus adjustment state (focus state), by driving the focus lens 131 through a focus motor 132. The focus lens 131 is a focus lens, and is schematically illustrated in FIG. 1 as a single lens. However, the focus lens 131 is typically configured from a plurality of lenses.

An object image focused on an image pickup element 141 by the photographic lens 101 configured from the above optical elements is converted by the image pickup element 141 into an electrical signal. The image pickup element 141 is a photoelectric conversion element that converts the object image (optical image) into the electrical signal by photoelectric conversion.

The image pickup element 141 has a configuration in which light-receiving elements, each element having m pixels in a cross (horizontal) direction and n pixels in a longitudinal (vertical) direction, are respectively laid out in two photoelectric conversion elements (light-receiving areas) described below.

The electrical signal obtained through the photoelectric conversion of the object image focused on the image pickup element 141 is made by an image pickup signal processing unit 142 as an image signal (image data).

A phase difference autofocus processing unit 135 acquires the image signals (signal values) individually (separately) output from the two photoelectric conversion elements (a first photoelectric conversion element and a second photoelectric conversion element) from the image pickup signal processing unit 142.

Then, the phase difference autofocus processing unit 135 detects (calculates) an image shift amount of an image in a dividing direction, the image being obtained through division of light from the object.

Further, the phase difference autofocus processing unit 135 calculates a shift amount (defocus amount) in a focusing direction of the photographic lens 101 based on the detected image shift amount. The defocus amount is calculated by multiplying the image shift amount by a coefficient (conversion coefficient).

Note that operations of the image shift amount calculation and the defocus amount calculation are performed based on commands of the main CPU 151. Further, at least a part of the operations may be executed by the main CPU 151 or the focus control unit 133.

The phase difference autofocus processing unit 135 outputs the calculated shift amount (defocus amount) to the focus control unit 133.

The focus control unit 133 determines a drive amount by which the focus motor 132 is driven, based on the shift amount of the photographic lens 101 in the focusing direction. Move control of the focus lens 131 by the focus control unit 133 and the focus motor 132 realizes AF control.

The image data output from the image pickup signal processing unit 142 is sent to an image pickup control unit 143, and is temporarily accumulated in a RAM 154 (random access memory).

The image data accumulated in the RAM 154 is compressed in an image compression/decompression unit 153, and is then recorded in a recording medium 157.

In parallel to that, the image data accumulated in the RAM 154 is sent to an image processing unit 152. The image processing unit 152 (image processing unit) processes the obtained image data using an added signal of the first photoelectric conversion element and the second photoelectric conversion element.

The image processing unit 152 performs reduction/enlargement processing for the image data into an optimum size, for example. The image data processed to have the optimum size is sent to a monitor display 150, and is displayed as an image.

Accordingly, an operator can observe a captured image in real time. Immediately after an image is captured, the monitor display 150 displays the captured image only for a predetermined time, so that the operator can confirm the captured image.

Further, the image processing unit 152 can perform object recognition such as face detection and body detection by reference to the image data accumulated in the RAM 154.

As an object recognition technique, a known detection technique is applied. An example of the known detection technique includes a scheme to search an image for a part having a characteristic in the shape, such as a face or a body, using template matching, and regard the part as an object if the part has high similarity.

Operations of the object recognition are performed based on commands of the main CPU 151. Alternatively, at least a part of the operations may be executed in the main CPU 151.

An operation unit 156 (operating switch) is used by the operator to provide an instruction to the image pickup device 100. An operation instruction signal input through the operation unit 156 is sent to the main CPU 151 through the bus 160.

The image pickup control unit 143 controls the image pickup element based on a command from the main CPU 151.

Prior to that, the main CPU 151 determines an accumulation time of the image pickup element 141 based on an instruction from the operation unit 156, or the size of the signal of the image data temporarily accumulated in the RAM 154.

Similarly, the main CPU 151 determines a value of a gain to be output from the image pickup element 141 to the image pickup signal processing unit 142 and a diaphragm value of the lens unit, based on the instruction from the operation unit 156, or the size of the signal of the image data temporarily accumulated in the RAM 154.

The image pickup control unit 143 receives the accumulation time and an instruction of a set value of the gain from the main CPU, and controls the image pickup element 141.

A battery 159 is appropriately managed by a power management unit 158, and supplies stable power to the entire image pickup device 100. A flash memory 155 stores a control diagram necessary for the operation of the image pickup device 100.

When the image pickup device 100 is started up by an operation of the operator (when the image pickup device 100 is transitioned from a power-off state to a power-on state), the control program stored in a flash memory 155 is read (loaded) to a part of the RAM 154.

The main CPU 151 controls the operation of the image pickup device 100 according to the control program loaded to the RAM 154.

(Description of Capturing Operation)

Figure 2:
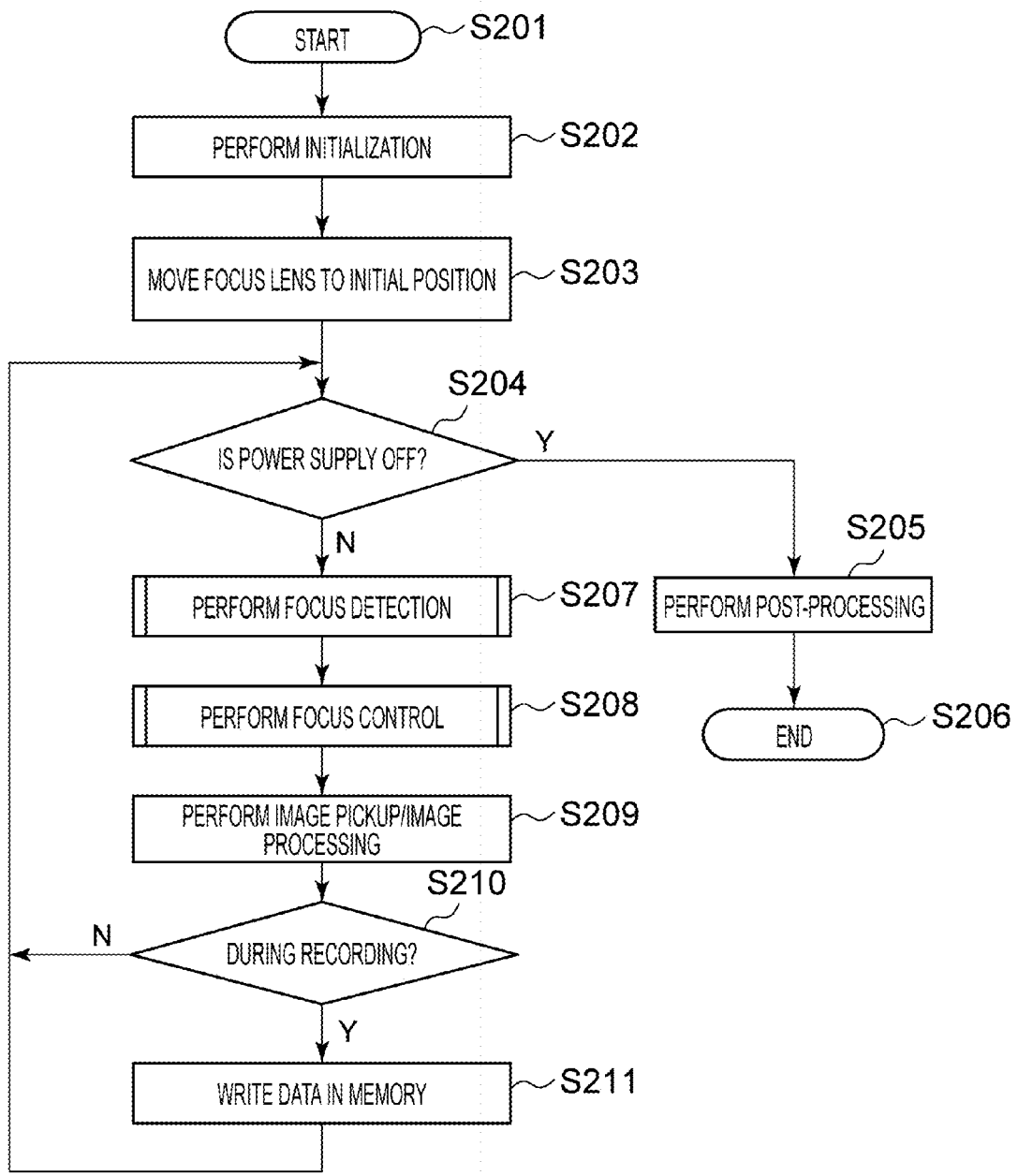
FIG. 2 is a flowchart illustrating an image pickup operation of the image pickup device in the present exemplary embodiment.

Next, a capturing operation including focus control (focus adjustment) of the image pickup device 100 will be described with reference to FIG. 2. FIG. 2 is a flowchart illustrating a capturing operation of the image pickup device 100.

Steps of FIG. 2 are performed based on a command according to a control program of the main CPU 151.

First, in step S201, when the image pickup device 100 is powered on, the main CPU 151 starts calculation (control).

Following that, in step S202, flags and control variables of the image pickup device 100 are initialized, and in step S203, the optical members (image pickup optical members) such as the focus lens 131 are moved to initial positions.

Next, in step S204, the main CPU 151 detects whether power-off operation has been performed by the operator (existence or non-existence of the power-off operation).

When the power-off operation has been detected in step S204, the operation proceeds to step S205.

In step S205, the main CPU 151 moves the image pickup optical members to the initial positions to turn off the power of the image pickup device 100, and performs post-processing such as clearing of the various flags and control variables.

Then, in step S206, the capturing operation (control) of the image pickup device 100 is terminated.

Meanwhile, when the power-off operation is not detected in step S204, the operation proceeds to step S207.

In step S207, the main CPU 151 performs focus detection processing.

Following that, in step S208, the focus control unit 133 drives the focus lens 131 according to a drive direction, velocity, and a position determined in step S207, and moves the focus lens 131 to a desired position.

Following that, in step S209, the image pickup element 141 photoelectrically converts an object image by main exposure, and generates an image pickup signal (image pickup processing).

Further, the image pickup signal processing unit 142 applies predetermined processing (image processing) to the image pickup signal generated by the photoelectric conversion to output an image signal and perform the object recognition.

Then, in step S210, the main CPU 151 detects whether a recording button (operation unit 156) has been pressed down by the operator, and determines whether it is during recording.

When it is not during recording, the operation returns to step S204. Meanwhile, when it is during recording, the operation proceeds to step S211.

In step S211, the image signal (image data) output from the image pickup signal processing unit 142 is applied compression processing by the image compression/decompression unit 153, and is recorded in the image recording medium 157.

Then, the operation returns to step S204, and the above steps are repeated.

(Description of Image Pickup Plane Phase Difference Detection Method)

Next, a phase difference detection method in the present exemplary embodiment will be described. First, a configuration of the image pickup element 141 will be described with reference to FIGS. 3A to 3C.

Figure 3A:
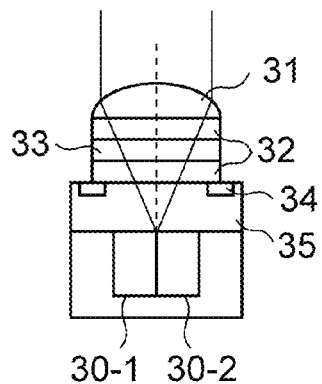
FIGS. 3A to 3C are diagrams for describing an image pickup element in the present exemplary embodiment.

FIG. 3A is a configuration diagram (sectional view) of the pixels of the image pickup element 141 having a pupil-dividing function.

A photoelectric conversion element 30 of each pixel is divided into two photoelectric conversion element 30-1 (first photoelectric conversion element) and photoelectric conversion element 30-2 (second photoelectric conversion element), and has the pupil-dividing function.

A micro lens 31 (on-chip micro lens) has a function to efficiently collect light to the photoelectric conversion element 30, and is laid out such that an optical axis accords with a boundary of the photoelectric conversion elements 30-1 and 30-2.

A flattening film 32, a color filter 33, a wiring line 34, and an interlayer insulation film 35 are provided to each pixel.

Figure 3B:
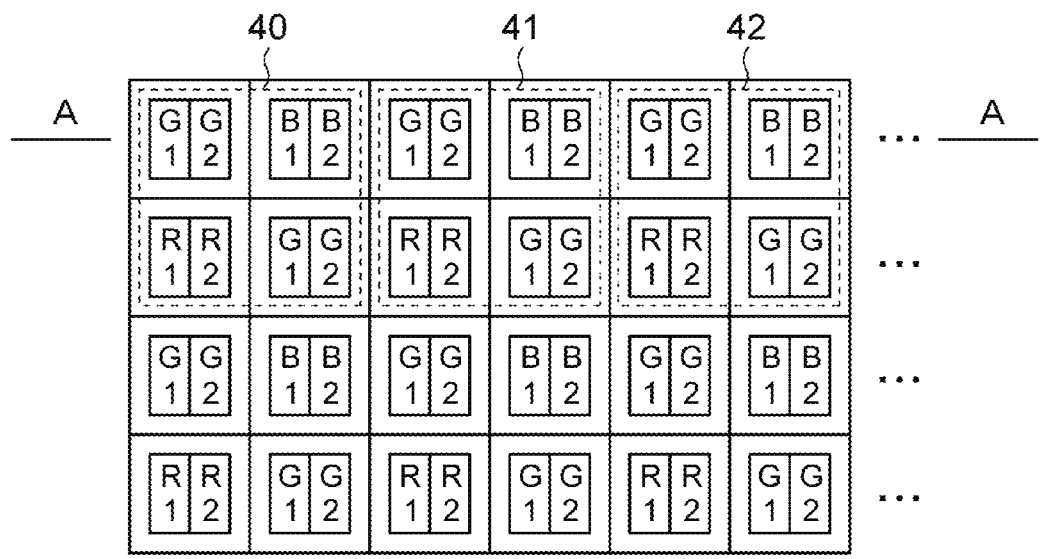

FIG. 3B is a diagram (plan view) illustrating a part of a pixel array included in the image pickup element 141. The image pickup element 141 is formed by arraying a plurality of pixels, each of the pixels having the configuration illustrated in FIG. 3A.

To perform image pickup, the color filters 33 of red (R), green (G), and blue (B) are alternately laid out in the pixels, and pixel blocks 40, 41, and 42, each of the pixel blocks forming one set with four pixels, are arrayed to configure a so-called Bayer array.

Note that "1" and "2" illustrated under R, G, and B in FIG. 3B respectively correspond to the photoelectric conversion elements 30-1 and 30-2.

Figure 3C:
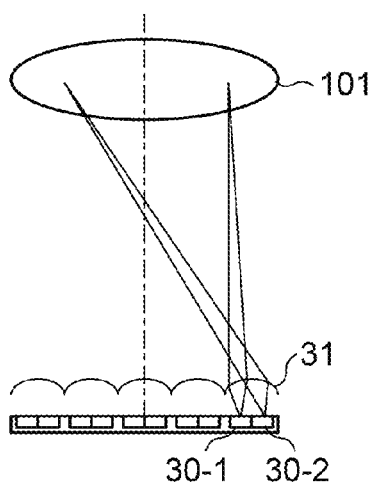

FIG. 3C is an optical principle diagram of the image pickup element 141, and illustrates a part of a cross section obtained by cutting the image pickup element 141 by the A-A line in FIG. 3B.

The image pickup element 141 is laid out on an expected image forming surface of the photographic lens 101. The photoelectric conversion elements 30-1 and 30-2 are configured to respectively receive a pair of light fluxes that has passed through different positions (areas) of a pupil (exit pupil) of the photographic lens 101 by the action of the micro lens 31.

The photoelectric conversion element 30-1 mainly receives the light flux transmitted through a right-side position in FIG. 3C of the pupil of the photographic lens 101. Meanwhile, the photoelectric conversion element 30-2 mainly receives the light flux transmitted through a left-side position in FIG. 3C of the pupil of the photographic lens 101.

(Description of Principle of Pupil of Photographic Lens)

Figure 4:
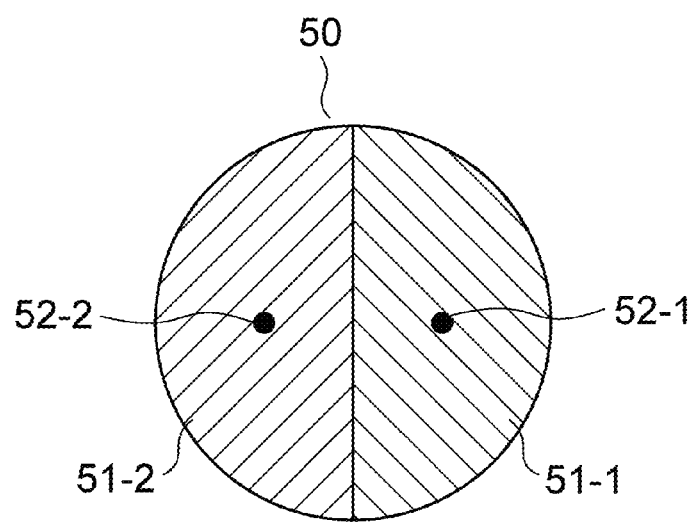
FIG. 4 is a diagram for describing pupil division of a photographic lens in the present exemplary embodiment.

Next, the pupil of the photographic lens 101 will be described with reference to FIG. 4. FIG. 4 is a diagram illustrating a pupil 50 of the photographic lens 101, as viewed from the image pickup element 141.

FIG. 4 illustrates a sensitivity area (hereinafter, referred to as "A image pupil") 51-1 of the photoelectric conversion element 30-1, and a sensitivity area (hereinafter, referred to as "B image pupil") 51-2 of the photoelectric conversion element 30-2.

FIG. 4 illustrates respective center of gravity positions 52-1 and 52-2 of the A image pupil and the B image pupil.

In a case where the image pickup processing of the present exemplary embodiment is performed, the image signal can be generated by adding outputs of two photoelectric conversion elements where the color filter of the same color is laid out in the same pixel.

Meanwhile, in a case where the focus detection processing of the present exemplary embodiment is performed, the focus detection signal of one pixel is acquired by integrating outputs from the photoelectric conversion elements corresponding to the photoelectric conversion elements 30-1 in each pixel block.

Then, an A image signal can be generated by continuously acquiring the signal in the cross (horizontal) direction like a direction of the pixel blocks 40, 41, and 42.

Similarly, the focus detection signal of one pixel is acquired by integrating outputs from the photoelectric conversion elements corresponding to the photoelectric conversion elements 30-2 in one pixel block.

Then, a B image signal can be generated by continuously acquiring the signal regarding the pixel blocks in the horizontal direction.

The A image signal and the B image signal generate a pair of phase difference detection signals.

(Description of Bayer Array)

Figure 5:
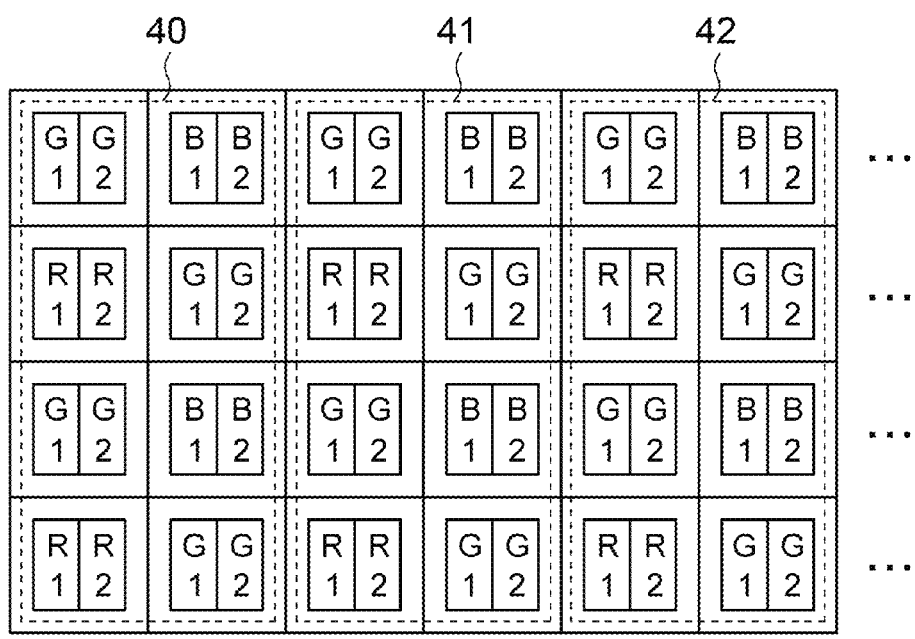
FIG. 5 is a diagram schematically illustrating an array of pixels of a focus detection area in the present exemplary embodiment.

As illustrated in FIG. 5, in the present exemplary embodiment, a Bayer array obtained by line luminance addition in the vertical direction in FIG. 5 in an adequate range is used.

In the example of FIG. 5, the image signals to be used for the focus detection are generated by obtaining an addition average using two pixel blocks in the Bayer array in the vertical direction. Note that the luminance addition number L1 can be arbitrarily set.

(Description of Image Shift Amount of Two Image Signals)

Next, the A image signal and the B image signal (hereinafter, collectively referred to as "image signals") will be described with reference to FIGS. 6A and 6B.

Figure 6A:
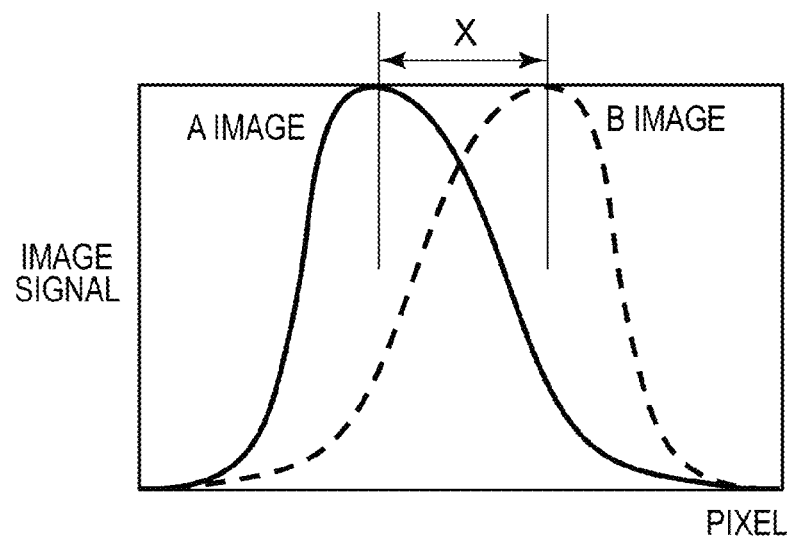
FIGS. 6A and 6B are diagrams illustrating an example of image signals in the present exemplary embodiment.

FIG. 6A is a diagram for describing the image signals. The vertical axis represents a level of the image signals and the horizontal axis represents the pixel position, respectively.

An image shift amount X of the generated pair of phase difference detection signals varies according to a focus state of the photographic lens 101 (a front focus state or a back focus state).

In a case where the photographic lens 101 is in the focus state, there is no image shift amount between the two image signals. Meanwhile, in a case where the photographic lens 101 is in the front focus state or the back focus state, the image shift amount occurs in a different direction.

Further, the image shift amount has a constant relationship with a distance between the position where the object image is focused through the photographic lens 101 and an upper surface of the micro lens, a so-called defocus amount.

Therefore, to calculate the image shift amount X, correlation calculation is performed for the two image signals.

In this correlation calculation, a correlation between the two image signals is calculated while the pixels are shifted, and a difference between positions where the correlation is maximized is calculated as the image shift amount.

Figure 6B:
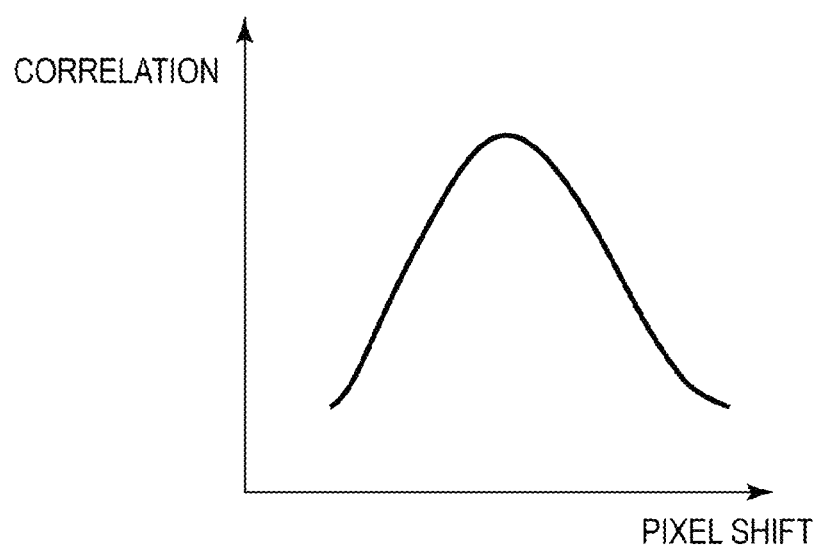

FIG. 6B is a diagram illustrating the correlation (hereinafter, referred to as correlation waveform) of when the pixels of the image signals are shifted.

In FIG. 6B, the horizontal axis represents the shift amount of the pixels, and the vertical axis represents the correlation between the A image signal and the B image signal at the time of shifting. The correlation calculation is performed in the main CPU 151.

The CPU 151 has a function as a pixel adding unit that performs pixel addition (luminance addition) of the focus detection signals output from the plurality of pixels that configures the image pickup element in the focus detection area.

The CPU 151 has a function as a correlation calculation unit that performs correlation calculation using a pixel addition value added in the pixel adding unit and calculates the correlation.

The CPU 151 has a function as a correlation adding unit that adds a plurality of the correlations calculated in the correlation calculation unit.

The image pickup element 141 has a function as an object detection unit that detects the size of an object in a captured screen.

The focus adjustment is performed by obtaining the defocus amount of the photographic lens from the image shift amount, and calculating a lens drive amount with which the photographic lens becomes in the focus state.

(Description of Conversion from Image Shift Amount into Defocus Amount)

Conversion from the image shift amount calculated by the correlation calculation into the defocus amount will be described with reference to FIG. 7.

Figure 7:
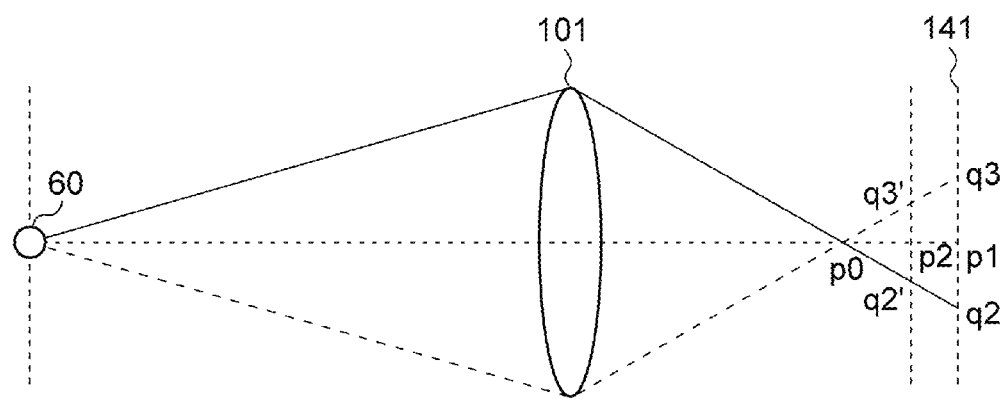
FIG. 7 is a diagram for describing an image pickup optical system in the present exemplary embodiment.

FIG. 7 is a diagram illustrating an optical system including the photographic lens 101 and the image pickup element 141. A position p1 of the focus detection surface exists on an optical axis OA of a position p0 of the expected image forming surface for an object 60.

The relationship between the image shift amount and the defocus amount is determined according to the optical system. The defocus amount can be calculated by multiplying the image shift amount X by a predetermined coefficient K (conversion coefficient).

The coefficient K is calculated based on a center of gravity position of the A image pupil and the B image pupil. In a case where the position p1 of the focus detection surface is moved to a position p2, the image shift amount is changed according to the similarity between a triangle formed with positions p0, q2, and q3 and a triangle formed with positions p0, q2', and q3'.

Therefore, the defocus amount at the position p2 of the focus detection surface can be calculated. The main CPU 151 calculates the position of the focus lens 131 for obtaining the focus state for the object, based on the defocus amount.

(Description of Method of Setting Focus Detection Area 71)

Figure 8A:
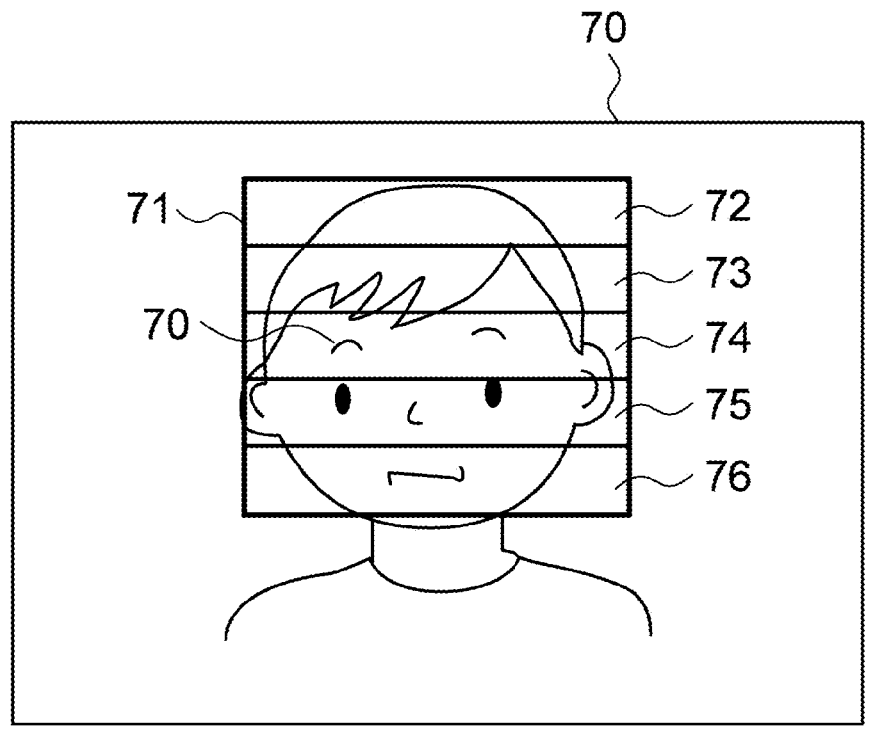
FIGS. 8A and 8B are diagrams illustrating a focus detection area in the present exemplary embodiment.
Figure 8B:
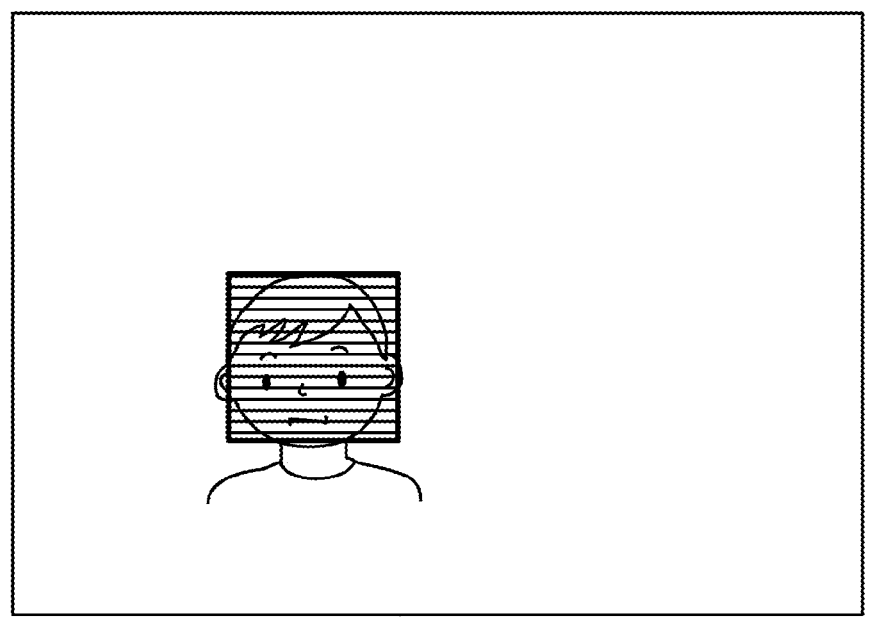

Next, setting of the focus detection area used in the focus detection method of the present exemplary embodiment will be described with reference to FIGS. 8A and 8B. FIGS. 8A and 8B are diagrams illustrating the focus detection area.

As illustrated in FIGS. 8A and 8B, a focus detection area 71 is provided to an image pickup field angle 70 at an appropriate position and with an appropriate size based on a detection frame by face recognition.

Accordingly, when a face is detected, the focus detection can be performed for the position of the face in the image pickup field angle 70.

FIG. 8A is a diagram illustrating the focus detection area of a case where the face is detected in a large manner. The focus detection area 71 includes focus detection areas 72 to 76 that are obtained by dividing the focus detection area 71 in the vertical direction in FIG. 8A.

In each of the divided focus detection areas 72 to 76, the phase difference autofocus processing unit 135 generates a phase difference detection signal obtained by the line luminance addition of the luminance addition number L1 in the focus detection area, and performs the focus detection.

When the correlation calculation is performed for all of the areas, the correlation waveforms of the number of divisions L2 are obtained. The correlation waveforms of the number of divisions L2 are added (hereinafter, written as correlation addition), so that a final correlation waveform in the focus detection area 71 is acquired.

The image shift amount X with which the correlation is maximized is calculated from the correlation waveform in the focus detection area 71.

In the case where the face is detected in a large manner, if the luminance addition number (pixel addition number) L1 is made large, the contrast of a portion of an eye, where the contrast can be obtained most effectively in the face, remains. Therefore, the luminance addition number L1 is made large and the correlation addition number L2 is made small.

FIG. 8A illustrates an example of a case where the luminance addition number L1 is 20 and the correlation addition number is 5.

FIG. 8B is a diagram illustrating the focus detection area of a case where the face is detected in a small manner. In the case where the face is detected in a small manner, if the luminance addition number L1 is made large, the contrast of the portion of the eye, where the contrast can be obtained most effectively in the face, is lost.

Therefore, the luminance addition number L1 is made small and the correlation addition number L2 is made large. In this case, the luminance addition number L1 is set to be 4 and the correlation addition number is set to be 20.

(Description of Flowchart Illustrating Method of Setting Focus Detection Area)

Figure 9:
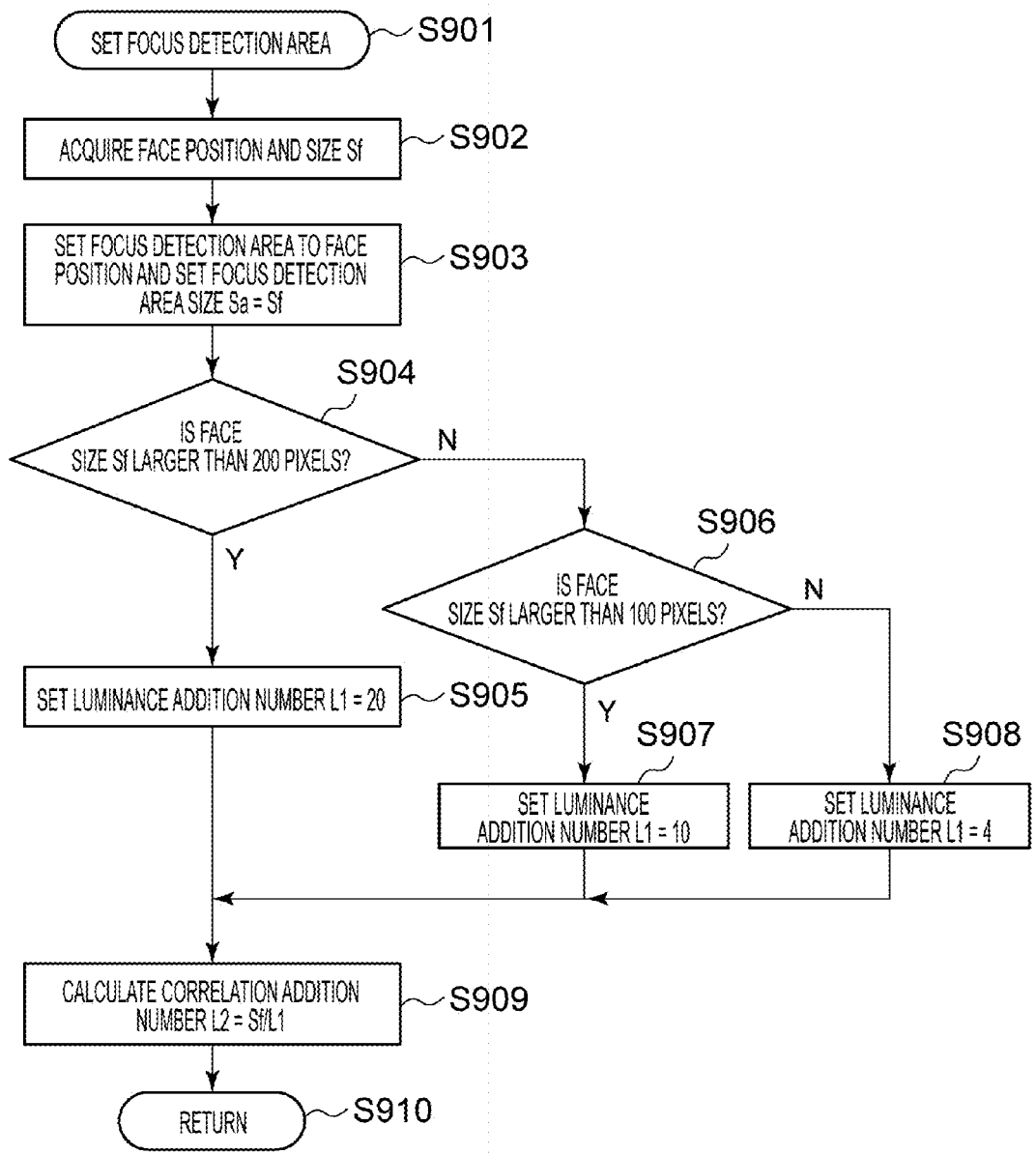
FIG. 9 is a flowchart illustrating a method of setting a focus detection area in the present exemplary embodiment.

FIG. 9 is a flowchart illustrating a method of setting the focus detection area in the present exemplary embodiment. Steps of FIG. 9 are performed by the main CPU 151.

The CPU 151 as an object detection unit has a function to detect the size of the face of the object and detect the body of the object.

First, in step S901, focus detection area setting is started. In step S902, a result of the face detection is acquired, and a detected position and a size Sf of the face are acquired.

In a case where a plurality of faces is detected, the position and the size Sf of the face that is a main object are acquired based on the result of the face recognition.

Then, in step S903, the focus detection area is set to the detected face position. In this case, a size Sa of the focus detection area is equivalent to the size of the face detected in step S902.

In step S904, the main CPU 151 determines whether the size of the face is larger than a predetermined amount.

In the present exemplary embodiment, whether the size of the face is larger than 200 pixels is determined. When the size Sf of the face is larger than 200 pixels, in step S905, the luminance addition number L1 is set to be 20.

Meanwhile, in step S906, when the size Sf of the face is smaller than 200 pixels, whether the size of the face is larger than 100 pixels is determined.

When the size Sf of the face is larger than 100 pixels, in step S907, the luminance addition number L1 is set to be 10. When the size Sf of the face is smaller than 100 pixels, in step S908, the luminance addition number L1 is set to be 4.

In step 909, the correlation addition number L2 is calculated. The correlation addition number L2 is calculated by dividing the size Sf of the face acquired in step 902 by the luminance addition number L1 determined in step S905, S907, or S908.

Then, in step S910, the processing is terminated. Note that the numerical values in the present exemplary embodiment are examples.

(Description of Focus Detection Operation)

Next, a focus detection operation by the focus adjustment device in the present exemplary embodiment will be described with reference to FIG. 10.

Figure 10:
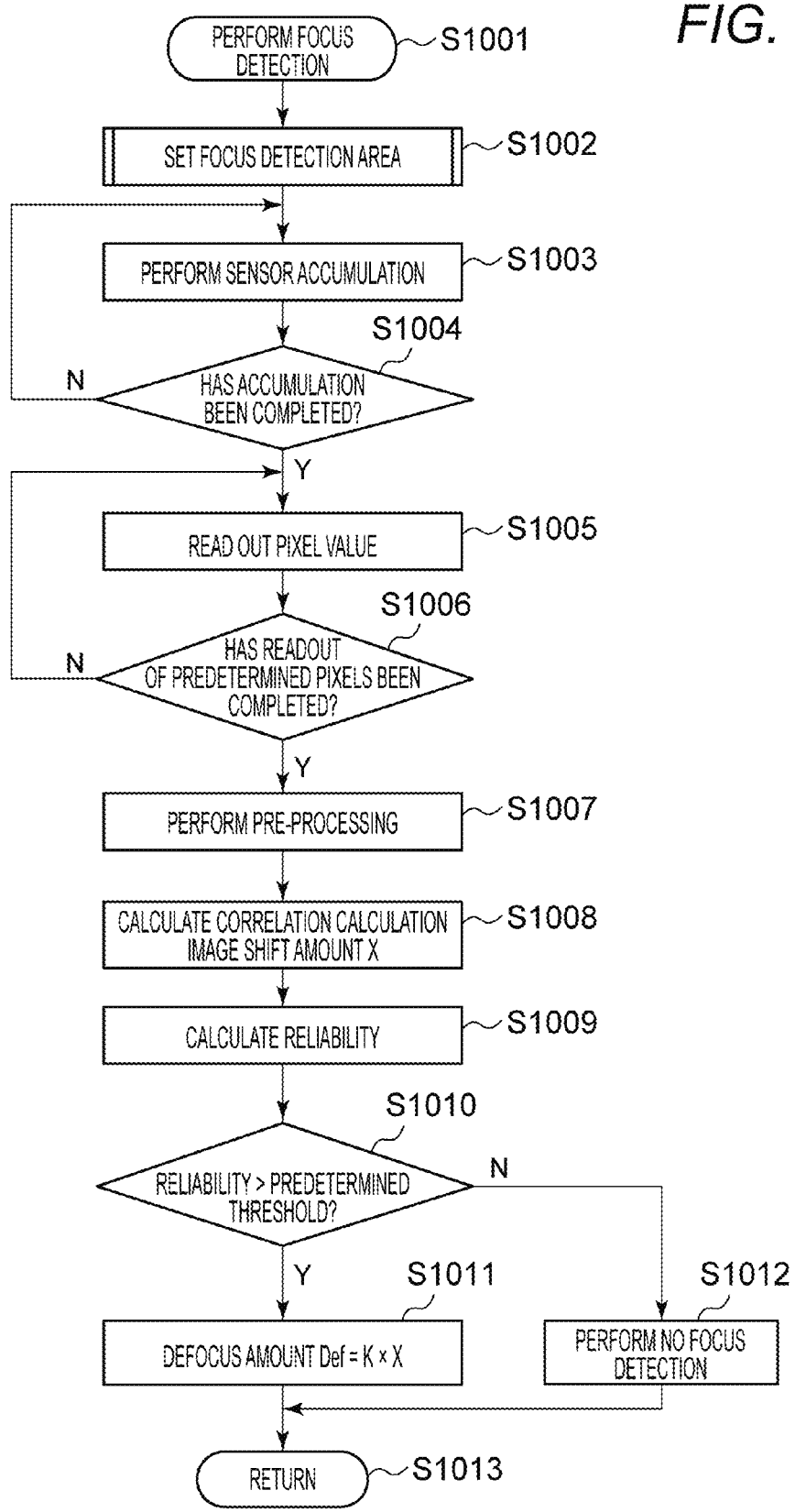
FIG. 10 is a flowchart illustrating a focus detection operation of a focus adjustment device in the present exemplary embodiment.

FIG. 10 is a flowchart illustrating a focus detection operation by the focus adjustment device in the present exemplary embodiment.

Steps of FIG. 10 are performed by the main CPU 151 executing the control program to control the units, and correspond to step S207 in FIG. 2.

First, in step S1001, the focus detection is started. In step S1002, the focus detection area setting illustrated in FIG. 9 is performed.

To acquire the image signals to be used for focus detection, the focus adjustment device waits for generation of the image signals from the image pickup signal that is obtained by the image pickup element 141 capturing and outputting the object image, in steps S1003 and S1004.

The main CPU 151 and the image pickup control unit 143 control the image pickup element to perform charge accumulation (exposure) according to a predetermined accumulation time (step S1003), and read pixel values of the image signals in the focus detection area in step S1005.

In step S1006, the main CPU 151 determines whether readout of a predetermined number of pixels in the focus detection area has been completed is determined.

When the readout of the predetermined number of pixels has not been completed, the operation returns to step S1005, and steps S1005 and S1006 are repeated until the readout of the predetermined number of pixels is terminated.

In step S1007, pre-correction processing is applied to the image signals. This pre-correction processing includes filter processing for removing noises and the like.

In step S1008, the main CPU 151 performs the correlation calculation for the image signals, and calculates the image shift amount X.

Following that, in step S1009, the main CPU 151 evaluates reliability of the calculated image shift amount X. An evaluation value regarding the reliability is calculated based on the contrast of the image signals, coincidence of the two image signals, and the like.

Following that, in step S1010, the main CPU 151 determines whether a reliable image shift amount X can be obtained, based on the calculated evaluation value of the reliability.

In this reliability determination, whether the evaluation value of the reliability calculated in step S1009 is larger than a predetermined threshold is determined. When the evaluation value is larger than the predetermined amount, it is determined that the image shift amount X is reliable. When the evaluation value is smaller than the predetermined amount, it is determined that the image shift amount X is not reliable.

Note that step S1010 includes determination as to whether the object is an object difficult for the correlation calculation to deal with.

When the image shift amount X is determined to be reliable, in step S1011, the main CPU 151 calculates a defocus amount Def by multiplying the calculated image shift amount X by the coefficient K (by the relational expression of Def=K×X).

Then, in step S1013, the focus detection is terminated, and the operation returns to the main routine that has called the present processing.

Meanwhile, in step S1011, when the reliable image shift amount cannot be detected, in step S1012, the phase difference autofocus is not performed (phase difference autofocus-NG).

Then, in step S1013, the focus detection is terminated, and the operation returns to the main routine that has called the present processing.

(Description of Focus Adjustment Operation)

Next, examples of a focus control operation (focus adjustment operation) of the focus adjustment device in accordance with the present invention will be described with reference to FIG. 11.

Figure 11:
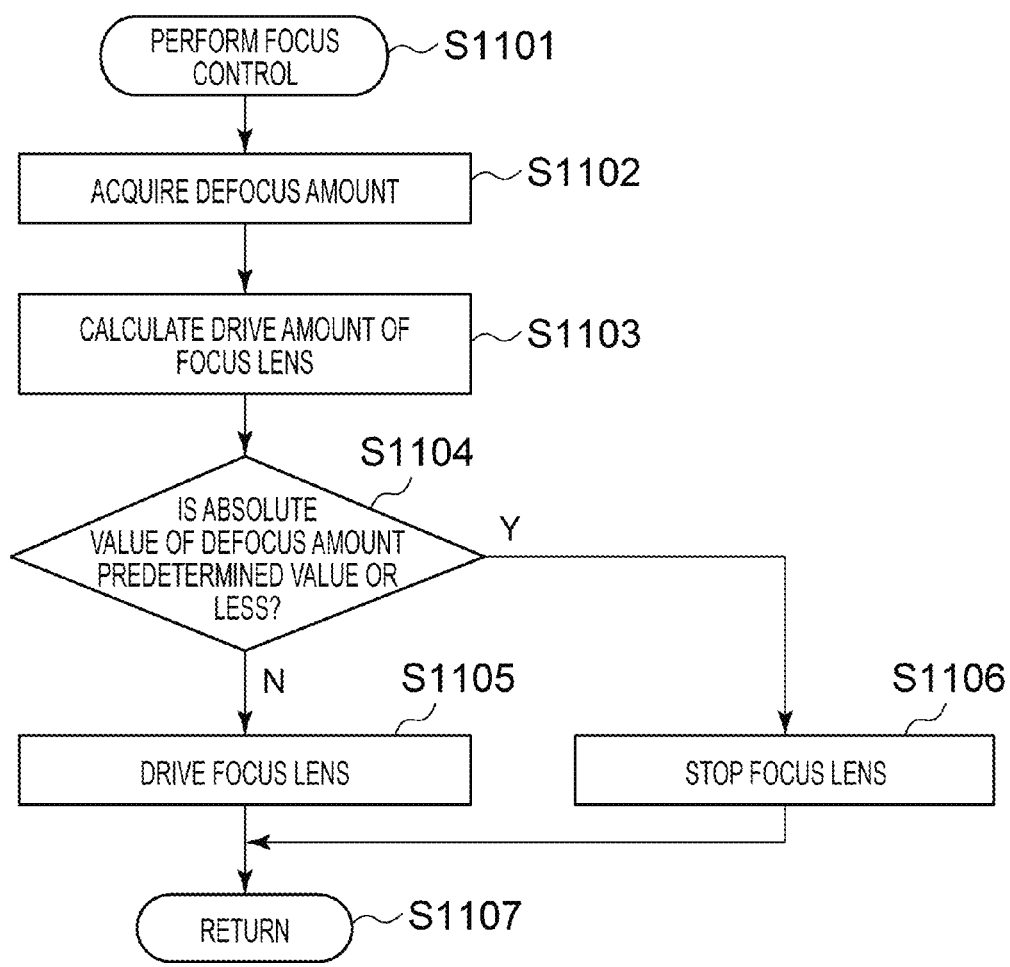
FIG. 11 is a flowchart illustrating a focus control method according to the present exemplary embodiment.

FIG. 11 is a flowchart illustrating a focus control operation of the focus adjustment device in the present exemplary embodiment. Steps illustrated in FIG. 11 are performed by the main CPU 151 and the focus control unit 133, and correspond to step S208 in FIG. 2.

When the focus control operation of the present exemplary embodiment is started, the main CPU 151 performs predetermined calculation according to the control program.

Then, the focus control unit 133 controls the focus motor 132 based on a command of the main CPU 151.

First, when the focus control is started in step S1101, in step S1102, the focus control unit 133 acquires the defocus amount calculated in the focus detection operation illustrated in FIG. 10.

Then, in step S1103, the focus control unit 133 calculates the drive amount (lens drive amount) of the focus lens 131 based on the defocus amount.

This calculation of the lens drive amount includes calculation of the lens drive direction and the velocity.

Following that, in step S1104, the main CPU 151 (focus control unit 133) determines whether an absolute value of the defocus amount is a predetermined amount or less.

In step S1104, when the absolute value of the defocus amount is not the predetermined amount or less, the operation proceeds to step S1105.

In step S1105, the position of the focus lens 131 is not regarded as a focus position (focal point). Therefore, the focus lens 131 is driven according to the lens drive amount calculated in step S1103, and the operation proceeds to step S1107.

Hereinafter, the focus detection and the focus lens drive are repeated according to the flow illustrated in FIG. 2.

Meanwhile, in step S1104, when the absolute value of the defocus amount is the predetermined amount or less, the operation proceeds to step S1106.

At this time, the focus lens position is regarded to be positioned at the focal point, in step S1106, the lens drive is stopped and the operation proceeds to step S1107.

Hereinafter, the focus detection is performed according to the flow illustrated in FIG. 2, and when the defocus amount exceeds the predetermined amount again, the focus lens 131 is driven.

The operation of the image pickup device 100 performs a plurality of number of times of the focus detection until the object is focused, by repeating the flows of FIGS. 7, 10, and 11, until the power is turned off, as illustrated in the flow of FIG. 2.

Note that, in FIG. 9, the method of changing the luminance addition number L1 and the correlation addition number L2 based on the size of the focus detection area has been described. However, in step S1107 of FIG. 11, the pre-processing may be changed such as use of different filters.

Further, the size of the focus detection area including the luminance addition number (pixel addition number) L1 and the correlation addition number L2 is variable according to the size of the detected face. However, an upper limit and a lower limit may be provided.

As described above, in the present exemplary embodiment, the addition number to be added in the pixel adding unit of a case where the size of the object is smaller than the predetermined amount is made smaller than the addition number to be added in the pixel adding unit of a case where the size of the object is the predetermined amount or more.

Then, the addition number to be added in the correlation adding unit of a case where the size of the object detected in the object detection unit is smaller than the predetermined amount is made larger than the addition number to be added in the correlation adding unit of a case where the size of the object detected in the object detection unit is the predetermined amount or more.

As described above, in the present exemplary embodiment, the focus detection area is set to the face area detected by the face recognition, whereby the focus detection can be performed for the face. Further, the luminance addition number and the correlation addition number of the focus detection area are set based on the size of the detected face, whereby the focus detection where a decrease in accuracy of the focus detection can be performed.

Second Exemplary Embodiment

Next, a method of setting a focus detection area in a second exemplary embodiment of the present invention will be described.

In the first exemplary embodiment, the method of setting the luminance addition number and the correlation addition number of the focus detection area according to the size of the detected face has been described.

In the present exemplary embodiment, a method of setting a size, a luminance addition number, and a correlation addition number of a focus detection area using a result of body detection other than face will be described.

In the present exemplary embodiment, the same content as that of the first exemplary embodiment is denoted with the same reference sign, and description thereof is omitted.

Figure 12:
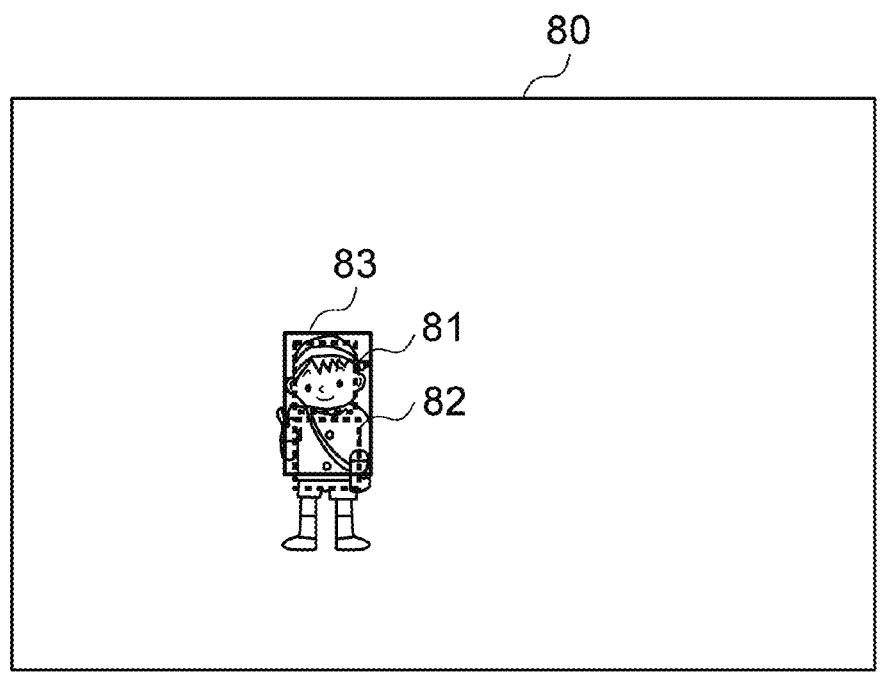
FIG. 12 is a diagram illustrating a focus detection area in a second exemplary embodiment.

FIG. 12 is a diagram illustrating a focus detection area of a case where a face is detected smaller than 100 pixels.

When the face is detected (expressed as a face detection frame 81) in an image pickup field angle 80, the focus detection area is set to accord with the face.

At this time, if the size of the face becomes small while the focus detection is repeatedly performed in accordance with the size of the face, a pixel size necessary for the focus detection may not be able to be obtained.

Therefore, as illustrated in FIG. 12, in a case where the size of the detected face is less than a predetermined amount, the focus detection area is enlarged in a direction in which the body exists, and a focus detection area 83 is set, using body detection information (expressed as a body detection frame 82) together with the face.

In the focus detection area 83, the enlargement of the focus detection area is realized by increasing a correlation addition number.

Figure 13:
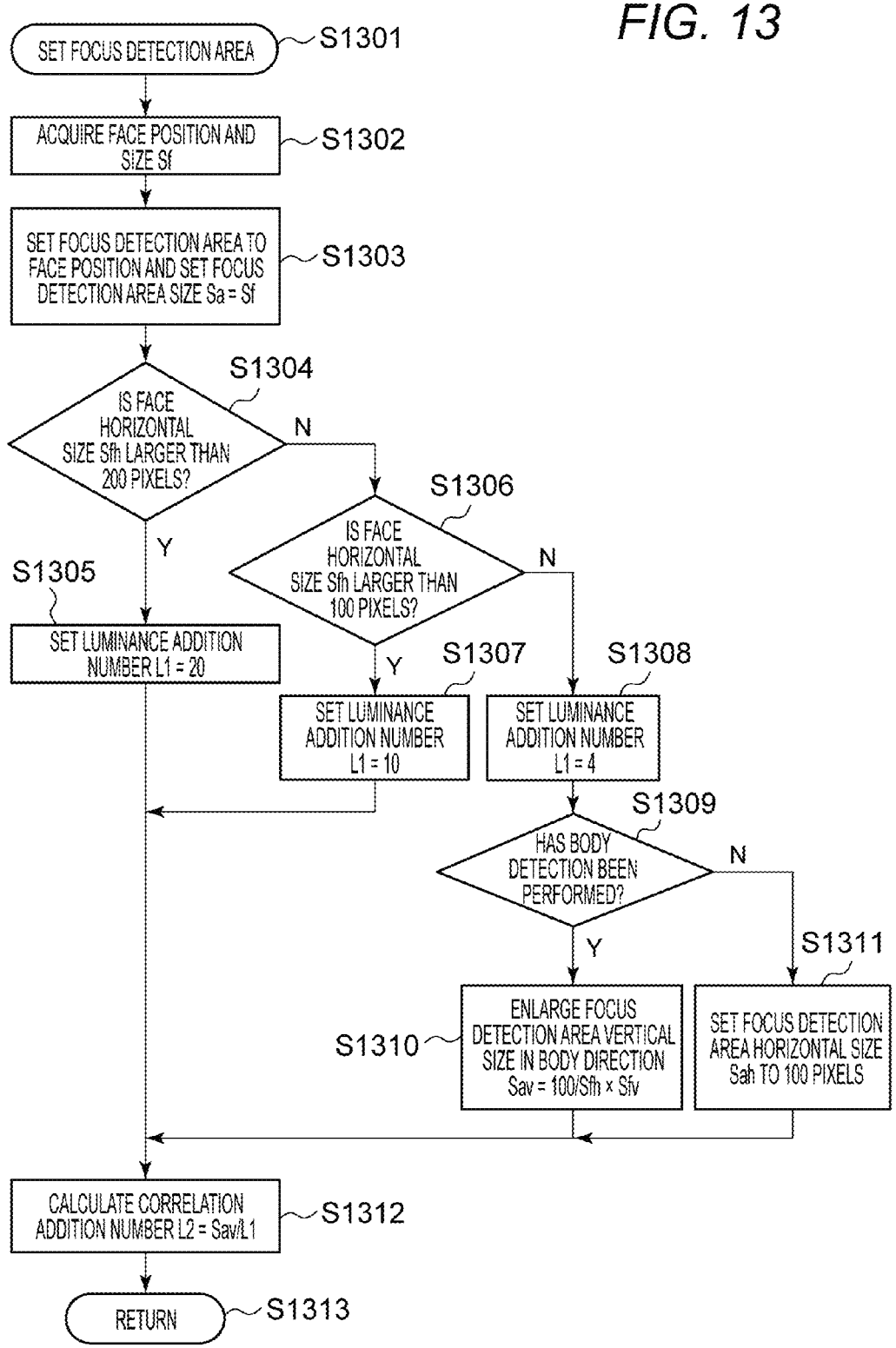
FIG. 13 is a flowchart illustrating a method of setting the focus detection area in the second exemplary embodiment.

FIG. 13 is a flowchart illustrating a method of setting the focus detection area in the present exemplary embodiment.

Steps S1301 to S1308 are similar to steps S901 to S908 in FIG. 9.

In step S1309, whether body detection has been performed from a captured image is determined. When the body detection has been performed, the method proceeds to step S1310. When the body detection has not been performed, the method proceeds to step S1311.

When the body detection has been performed, in step S1310, the focus detection area is enlarged in a body direction into which a vertical size of the focus detection area has been detected.

An enlarging size at this time is obtained by:

$$Sav=100/Sfh \times Sfv$$

where a vertical size of the focus detection area is Sav, and a horizontal size of the face detection is Sfh and a vertical size of the face detection is Sfv.

When the body detection has not been performed, in step S1311, a horizontal size Sah of the focus detection area is set to 100 pixels.

In step S1312, a correlation addition number L2 is calculated, similarly to step S909 in FIG. 9.

The correlation addition number L2 is calculated by dividing the calculated vertical size Sav of the focus detection area by a luminance addition number L1 determined in step S1305, S1307, or S1308.

As described above, in the present exemplary embodiment, the size of the focus detection area is set based on detection information of the face and the body in setting the focus detection area. Along with it, the luminance addition number and the correlation addition number are set, whereby the focus detection where a decrease in accuracy of the focus detection is suppressed can be performed.

In the present exemplary embodiment, when the size of the face detected by an object detection unit is smaller than a predetermined amount, the focus detection area set to an area corresponding to the face is enlarged to the size including the body of the object in addition to the face. Then, an addition number to be added in a correlation adding unit is increased relative to that of before the focus detection area is enlarged.

In the present exemplary embodiment, when the size of the face detected in the object detection unit is smaller than the predetermined amount, and the body of the object is not detected, the focus detection area set to the area corresponding to the face is enlarged in a focus evaluation direction. Then, the addition number to be added in the correlation adding unit is increased relative to that of before the focus detection area is enlarged.

In the present exemplary embodiment, setting of the case where the body detection is possible has been described. However, for example, in a case where the body detection is not possible, such as a case where only the face appears in a field angle 70 and the body exists outside the field angle, the case may be handled by enlarging the horizontal size of the focus detection area.

The horizontal size Sah of the focus detection area of this time is set in step S1311 to become larger than 100 pixels by a ratio of the size by which the focus detection area was supposed to be made large in the body direction. Further, as for the luminance addition number of this time, the luminance addition number set in step S1308 is used as it is because of continuity with the setting at the time of the setting of the previous focus detection.

Further, in an image pickup device having a configuration that repeatedly performs the focus detection to bring focus of a camera into a focus position, contrast and the defocus amounts at the time of the previous focus detection may be used for setting of the luminance addition number L1 and the correlation addition number L2.

In this case, the luminance addition number is made smaller and the correlation addition amount is made larger as the contrast is higher.

A CPU 151 has a function as a contrast calculation unit that calculates a contrast value in a captured screen using output signals output from pixels of an image pickup element.

An index of the contrast is obtained by calculating squares of adjacent differences of pixel values, and calculating accumulation of the squares of one line in the focus detection area.

The calculating contrast may be a total sum of absolute values of the adjacent differences of the pixel values. The contrast in the focus detection area is calculated, and whether the contrast is larger than a predetermined amount is determined and whether the object has low luminance is determined.

When the object has low luminance, the luminance addition number is doubled and made large and the correlation addition number is made small. When the object does not have low luminance, the luminance addition number is made small and the correlation addition number is made large.

In the case of low luminance, noises are suppressed by increasing the luminance addition number, and then the correlation calculation is performed, so that a decrease in accuracy of the focus detection can be suppressed. Not only the size of the object, but also the contrast of the object is determined, and the luminance addition number and the correlation addition number are set, whereby the decrease in accuracy of the focus detection is suppressed.

That is, the addition number to be added in the pixel adding unit of a case where the contrast value is larger than a predetermined amount is smaller than the addition number to be added in the pixel adding unit of a case where the contrast value is the predetermined amount or less.

Then, the addition number to be added in the correlation adding unit of a case where the contrast value is larger than the predetermined amount is larger than the addition number to be added in the correlation adding unit of a case where the contrast value is the predetermined amount or less.

Further, the luminance addition number (pixel addition number) is made smaller and the correlation addition amount is made larger as the previous defocus amount is smaller.

The CPU 151 has a function as an image shift amount calculation unit that calculates an image shift amount using the added correlations added in the correlation adding unit.

When the position of a current focus lens is close to the focus position, the luminance addition number is made small and the correlation addition number is made large so that resolution of the object is increased and the focus detection is performed.

When the position of the current focus lens is far from the focus position, the contrast is easily made small. The luminance addition number is increased and the noises are suppressed, then correlation calculation is performed, whereby the decrease in accuracy of the focus detection can be suppressed.

Not only the size of the object, but also the previous defocus amount is determined, and the luminance addition number and the correlation addition number are set, whereby the decrease in accuracy of the focus detection is suppressed.

A plurality of number of times of the focus detection is performed until the object is focused, and thus the luminance addition number and the correlation addition number can be controlled based on object information in the previous focus detection, regarding the focus detection of second and subsequent times, of the plurality of number of times of the focus detection.

An object image obtained by an image pickup element 141 becomes clear as the focus lens position gets closer to the focus position. Therefore, setting of the luminance addition number and the correlation addition number can be brought to setting more suitable for the object.

That is, the addition number to be added in the pixel adding unit of a case where the defocus amount is larger than a predetermined amount is larger than the addition number to be added in the pixel adding unit of a case where the defocus amount is the predetermined amount or less.

Then, the addition number to be added in the correlation adding unit of a case where a focus amount is larger than a predetermined amount is smaller than the addition number to be added in the correlation adding unit of a case where the defocus amount is the predetermined amount or less.

Note that the numerical values in the present exemplary embodiment are examples, and the method of setting the luminance addition number L1 and the correlation addition number L2 in stages according to the size of the face has been described.

However, for example, the luminance addition number L1 may be set to be proportional to the size of the face. Further, upper limits and lower limits may be set to the luminance addition number L1 and the correlation addition number L2.

According to the exemplary embodiments, the luminance addition number L1 and the correlation addition number L2 of the focus detection area are set according to the size of when the face is detected, whereby a highly accurate focus adjustment device can be provided.

Various exemplary embodiments of the present invention have been described. However, the present invention is not limited to these exemplary embodiments, and various modifications and changes can be made within the scope of the spirit of the present invention.

Other Exemplary Embodiments

Features of the present invention can also be achieved, for example, as follows. A storage medium records a program code of software in which a procedure for realizing the functions of the exemplary embodiments is written is supplied to a system or a device.

Then, a computer (or a CPU, an MPU, or the like) of the system or the device reads the program code stored in the storage medium and executes the program code.

In this case, the program code itself embodied in the storage medium is an embodiment of the present invention, and the storage medium that stores the program code and the program may be used to configure an embodiment(s) of the present invention.

Examples of the storage medium for supply the program code include a flexible disk, a hard disk, an optical disk, and a magneto-optical disk.

Further, a CD-ROM, a CD-R, a CD-RW, a DVD-ROM, a DVD-RAM, a DVD-RW, a DVD-R, a magnetic tape, a non-volatile memory card, or a ROM can be used.

Further, the program code read by the computer is made executable, whereby the functions of the exemplary embodiments are realized.

Further, a case in which a part or all of actual processing is performed by an operating system (OS) operated on a computer, based on an instruction of the program code, and the functions of the exemplary embodiments are realized by the processing is also an embodiment of the present invention.

Further, the following case is also an embodiment of the present invention. First, a program code read from a storage medium is written in a memory included in a function expansion board inserted in a computer or a function extension unit connected to the computer.

Following that, a CPU or the like included in the function expansion board or the function expansion unit performs a part or all of actual processing, based on an instruction of the program code.

Further, various embodiments of the present invention can be applied not only to the devices primarily intended to capture an image, such as a digital camera, but also to arbitrary devices that have the image pickup device built in or are connected to the image pickup device, such as a mobile phone, a personal computer (a lap-top type, a desk-top type, and a tablet type), and a game device.

Therefore, the "image pickup device" in the present specification is intended to include arbitrary electronic devices including the image pickup function.

According to an aspect of the present invention, a decrease in accuracy of the focus detection in performing the focus detection based on the photographing conditions of an object (the size of the object, the defocus amount, and the contrast value), and a high accurate focus adjustment device can be provided.

Other Embodiments

Various embodiments of the present invention can also be realized by a computer of a system or apparatus that reads out and executes computer executable instructions recorded on a storage medium (e.g., non-transitory computer-readable storage medium) to perform the functions of one or more of the above-described exemplary embodiment(s) of the present invention, and by a method performed by the computer of the system or apparatus by, for example, reading out and executing the computer executable instructions from the storage medium to perform the functions of one or more of the above-described exemplary embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-170593, filed Aug. 31, 2015, which is hereby incorporated by reference herein in its entirety.

What is claimed is:

1. A calculation device that calculates a defocus amount using a parallax image signal output from an image pickup element, the calculation device comprising:
a calculation unit configured to acquire a first correlation signal of the parallax image signal, composite a plurality of the first correlation signals to acquire a second correlation signal, and calculate the defocus amount based on the second correlation signal; and
a detection unit configured to detect a predetermined object, wherein
a composite amount of signals from the image pickup element in acquiring the first correlation signal of a case where a size of the object detected in the detection unit is smaller than a predetermined amount is smaller than a composite amount of signals from the image pickup element in acquiring the first correlation signal of a case where the size of the object detected in the object detection unit is the predetermined amount or more, and
a composite amount of the first correlation signals in acquiring the second correlation signal of a case where the size of the object detected in the object detection unit is smaller than the predetermined amount is larger than a composite amount of the first correlation signals in acquiring the second correlation signal of a case where the size of the object detected in the object detection unit is the predetermined amount or more.

2. The calculation device according to claim 1, wherein, when a size of a face detected in the detection unit is smaller than a predetermined amount, the composite amount of signals from the image pickup element in acquiring the first correlation signal is smaller than the composite amount of signals from the image pickup element in acquiring the first correlation signal of a case where the size of the object detected in the object detection unit is the predetermined amount or more.

3. The calculation device according to claim 1, wherein the detection unit has a function to detect a size of a face of the object, and to detect a body of the objet, and, when the size of the face detected in the detection unit is smaller than a predetermined amount and the body of the object is not detected, a composite amount number is increased in a correlation calculation direction set to an area corresponding to the face, relative to a case where the size of the face is larger than the predetermined amount.

4. An image pickup device comprising:
the calculation device according to claim 1; and
the image pickup element.

5. The calculation device according to claim 1, wherein the composite of the signals from the image pickup element in acquiring the first correlation signal is a composite of parallax images from an area corresponding to a focus detection area of outputs from a plurality of pixels of the image pickup element.

6. A calculation device for calculating a defocus amount using a parallax image signal output from an image pickup element, the calculation device comprising:
by a calculation unit, acquiring a first correlation signal of the parallax image signal, compositing a plurality of the first correlation signals to acquire a second correlation signal, and calculating the defocus amount based on the second correlation signal; and
by a detection unit, detecting a predetermined object, wherein
a composite amount of signals from the image pickup element in acquiring the first correlation signal of a case where a size of the object detected in the detection unit is smaller than a predetermined amount is smaller than a composite amount of signals from the image pickup element in acquiring the first correlation signal of a case where the size of the object detected in the object detection unit is the predetermined amount or more, and
a composite amount of the first correlation signals in acquiring the second correlation signal of a case where the size of the object detected in the object detection unit is smaller than the predetermined amount is larger than a composite amount of the first correlation signals in acquiring the second correlation signal of a case where the size of the object detected in the object detection unit is the predetermined amount or more.

* * * * *